United States Patent [19]

Mizuhara

[11] Patent Number: 4,667,871
[45] Date of Patent: May 26, 1987

[54] TIN BASED DUCTILE BRAZING ALLOYS

[75] Inventor: Howard Mizuhara, Hillsborough, Calif.

[73] Assignee: GTE Products Corporation, Stamford, Conn.

[21] Appl. No.: 914,965

[22] Filed: Oct. 3, 1986

Related U.S. Application Data

[62] Division of Ser. No. 758,914, Jul. 24, 1985, Pat. No. 4,643,875.

[51] Int. Cl.⁴ .............................................. B23K 1/04
[52] U.S. Cl. ................................ 228/122; 228/263.12
[58] Field of Search ............... 228/119, 122, 121, 124, 228/263.12

[56] References Cited

U.S. PATENT DOCUMENTS

| | | | |
|---|---|---|---|
| 3,628,234 | 12/1971 | Russell | 228/122 |
| 4,426,033 | 1/1984 | Mizuhara | 228/122 X |
| 4,448,605 | 5/1984 | Mizuhara | 228/263.11 X |
| 4,603,090 | 7/1986 | Mizuhara | 228/263.11 X |

FOREIGN PATENT DOCUMENTS 258013  11/1969  U.S.S.R. ............................. 420/587

Primary Examiner—Kenneth J. Ramsey
Attorney, Agent, or Firm—James Theodosopoulos

[57] ABSTRACT

An alloy for brazing ceramic to a ceramic or a metal consists essentially of 35 to 95% tin, 0.5 to 70% silver, 0.5 to 20% copper, 0.1 to 4% titanium and/or vanadium and/or zirconium, 0 to 5% nickel, 0 to 2% chromium, all percentages by weight.

7 Claims, No Drawings

TIN BASED DUCTILE BRAZING ALLOYS

This application is a division, of application Ser. No. 758,914, filed July 24, 1985 now U.S. Pat. No. 4,643,875.

This invention concerns ductile brazing alloys that can be used for joining two materials that may have large thermal expansion differences, for example, for joining ceramic to ceramic or ceramic to metal. Many present brazing alloys for that purpose contain high vapor pressure elements, such as zinc, lead cadmium, phosphorus, etc., which can be detrimental in vacuum tubes and other electronic components. A common practice in joining a ceramic requires that the ceramic be first precoated with a metal layer. This can be expensive.

This invention discloses a brazing alloy that does not require precoating and does not utilize high vapor pressure elements. The alloy consists essentially of tin, silver, copper and titanium with optional small amounts of nickel or chromium. Vanadium and/or zirconium may be used with or as a substitute for the titanium. The alloy on melting forms a single phase melt with all ingredients in solution such that the alloy can be cast into a mold and yield a sound ingot. A differential thermal analysis trace shows a distinct melting and solidification phase change. This is in contradistinction to composite systems in which fine powders of various elements are mixed, compacted and rolled into a foil. Such a foil on melting can exhibit an extreme solidus-liquidus temperature range. During heating, the liquid phase (lowest melting alloy) composition can flow away from the main composite alloy system, thereby separating from the high temperature phase. The high temperature phase (skeleton) without the low temperature system cannot melt even though the temperature is raised to the defined melting point.

A brazing alloy in accordance with this invention has the following composition: 35 to 95% tin; 0.5 to 70% silver; 0.5 to 20% copper; 0.1 to 4% titanium, vanadium and/or zirconium; 0 to 5% nickel; 0 to 2% chromium, all percentages by weight. It is preferably made by melting under vacuum to prevent contamination from gases such as hydrogen, oxygen, nitrogen or water vapor which could be present in inert gases and which could react with the reactive elements of the alloy. The alloy is ductile and has a low solidus temperature to provide a low stress joint between two materials having different thermal expansion. Preferably, the brazing alloy is in the form of a thin foil, cut to a suitable shape, and brazing is effected under vacuum.

EXAMPLE 1

An alloy of 93.5% Sn, 4% Ag, 1.5% Cu, 1% Zr was alloyed and cast into a sheet ingot. The ingot rolled easily to a 4 mil thickness foil. A differential thermal analysis showed temperatures of 215° C. liquidus and 214° C. solidus. Foils were placed between alumina discs ¾" diameter by 60 mils thick and two such assemblies were brazed at temperatures of 500° C. and 600° C. under $10^{-5}$ torr vacuum. The strength of the 6000 joint was good but on impact split open. Analysis showed marginal ceramic to metal joint.

EXAMPLE 2

A cast alloy with composition of 92.0% Sn, 5% Ag, 1.75% Cu, 1.25% Ti was rolled down to a 4 mil foil with 200° C. intermediate anneal. The alloy foil was placed between two 99.5% alumina ¾" diameter by 50 mils thick discs and heated to various temperatures by 10 minute hold under $10^{-5}$ torr vacuum.

| 500° C. | 550° C. | 600° C. |
|---|---|---|
| Insufficient Wetting | Good Joint | Excellent Joint |

The discs brazed at 600° C. could not be parted even after breaking the discs in half.

EXAMPLE 3

An alloy of 85% Sn, 5% Ag, 9% Cu, 1% Ti was melted in an alumina crucible at 700° C. under $10^{-5}$ torr vacuum and cast into a sheet mold. The alloy is ductile and it was rolled down to a 4 mil foil without difficulty. The alloy foil was then placed between a partially stabilized zirconia disc ¾" diameter by 100 mils thick and a ¼" by 1" by 10 mil thick Kovar strip. Three brazes were carried out under $10^{-5}$ torr vacuum for 10 minutes each. The result shows that 600° C. resulted in the best braze.

| 500° C. | 550° C. | 600° C. |
|---|---|---|
| Marginal Bond | Good Bond | Excellent Bond |

This alloy had a liquidus temperature of 217° C. Kovar is a Trademark of Westinghouse Co. for a nickel-iron cobalt-alloy.

EXAMPLE 4

An alloy of 68% Sn, 15% Ag, 15% Cu, 2.0% Ti was melted and cast into ¼" copper mold. The alloy was ductile and cold rolled down to 5 mil with 2 intermediate anneals at 250° C. The foil was placed between two silicon nitride ceramic discs. The assemblies were heated to various temperatures under $10^{-5}$ torr vacuum for 10 minutes hold at respective braze temperatures. The differential thermal analysis trace shows a liquidus of 470° and a solidus of 330° C.

| 500° C. | 550° C. | 600° C. |
|---|---|---|
| Marginal Joint | Good | Excellent Joint |

EXAMPLE 5

An alloy with a composition of 59% Sn, 32% Ag, 7% Cu, 2.0% Ti was vacuum melted and cast into a copper mold. The cast alloy was warm rolled down at about 200° C. down to 6 mil foil. The differential thermal analysis trace showed a 428° C. liquidus, 340° C. solidus. Based on this data, brazing tests were carried out at 500° C., 550° C., and 600° C. under $10^{-5}$ torr vacuum. A 6 mil foil was placed between silicon nitride solid right angle cylinders and brazed at above temperatures. The 600° C. brazing temperature resulted in an excellent brazed joint.

EXAMPLE 6

An alloy of 49% Sn, 40% Ag, 10% Cu, 1% Ti was vacuum melted and cast into a copper mold. The alloy was marginally ductile and required considerable number of heatings during hot working. A 6 mil foil was produced and assemblies were made by placing the foil between ½" cubes of silicon carbide and Kovar strips 1"

by ¼" by 10 mils thick. The assemblies were heated to various temperatures from 500° C. to 600° based on a differential thermal trace which showed a liquidus of 445° C. and a solidus of 350° C. The best brazed joint strength was obtained at 600° C. for 10 minutes under $10^{-5}$ torr vacuum.

EXAMPLE 7

An alloy of 68% Sn, 14% Ag, 15% Cu, 1% Ni, 2% Ti was cast into sheet ingot mold. The ingot was rolled to 4 mil foil and used to braze a Kovar strip, 10 mils thick by 0.25" by 3", onto 1.2" by 1.2" by 100 mils thick 99.5% alumina substrate at 600° C. under $10^{-5}$ torr vacuum. The peel strength was 14 pounds. This alloy had a liquidus temperature of 480° C., a solidus temperature of 340° C.

EXAMPLE 8

An alloy of 68% Sn, 14.5% Ag, 15% Cu, 0.5% Cr, 2% Ti was cast and rolled to 4 mil thickness foil. The foil was used to braze Kovar strip to 99.5% alumina as described in Example 7.

The braze was brighter and showed improved wetting over composition used in Examples 4 and 7. The peel strength was 16 pounds. This alloy had a liquidus temperature of 490° C., a solidus temperature of 340° C.

In this specification, the definition of liquidus is a temperature when all the ingredients are molten. The solidus is a temperature at which the first sign of liquid is observed during heating. In reverse, when cooling a melt, the temperature at which a first sign of solid appears is the liquidus temperature and when the last trace of liquid is solidified is called solidus.

I claim:

1. The method of joining two parts comprising a ceramic and a ceramic or metal comprising the steps of: preparing a composition essentially of 35 to 95% tin, 0.5 to 70% silver, 0.5 to 20% copper, 0.1 to 4% titanium and/or vanadium and/or zirconium, 0 to 5% nickel, 0 to 2% chromium, all percentages by weight; vacuum melting the composition and casting into a mold to form a brazing alloy ingot; rolling the brazing alloy ingot to a thin foil; disposing a suitable shape of the foil between the two parts to be joined; and vacuum melting the foil shape to braze the two parts together.

2. The method of claim 1 where the vacuum melting braze step is effected at a temperature above the liquidus temperature of the brazing alloy.

3. The method of claim 1 where the first ceramic part comprises alumina.

4. The method of claim 1 where the first ceramic part comprises silicon nitride.

5. The method of claim 1 where the first ceramic part comprises zirconia.

6. The method of preparing a ductile brazing alloy comprising the steps of preparing a composition consisting essentially of 35 to 95% tin, 0.5 to 70% silver, 0.5 to 20% copper, 0.1 to 4% titanium and/or vanadium and/or zirconium, 0 to 5% nickel, 0 to 2% chromium, all percentages by weight and vacuum melting the composition to form a single phase melt brazing alloy.

7. The method of claim 6 including the steps of casting the brazing alloy into an ingot in sheet form and then rolling the sheet into a thin foil.

* * * * *